(12) United States Patent
Cordobes

(10) Patent No.: US 7,891,108 B1
(45) Date of Patent: Feb. 22, 2011

(54) UTILITY BOX MARKING DEVICE

(76) Inventor: Robert S. Cordobes, 35049 Palgrave Rd., Acton, CA (US) 93510

( * ) Notice: Subject to any disclaimer, the term of this patent is extended or adjusted under 35 U.S.C. 154(b) by 0 days.

(21) Appl. No.: 12/554,909

(22) Filed: Sep. 5, 2009

Related U.S. Application Data

(60) Provisional application No. 61/191,059, filed on Sep. 5, 2008.

(51) Int. Cl.
*G01B 1/00* (2006.01)

(52) U.S. Cl. .................. 33/528; 33/563; 33/DIG. 10

(58) Field of Classification Search ............ 33/528, 33/562, 563, DIG. 1, DIG. 10
See application file for complete search history.

(56) References Cited

U.S. PATENT DOCUMENTS

| | | | |
|---|---|---|---|
| 1,362,726 A | 12/1920 | Mason | |
| 2,992,490 A * | 7/1961 | Hay et al. | 33/528 |
| 3,888,013 A | 6/1975 | Benoit | |
| 4,212,110 A | 7/1980 | Hill | |
| 4,339,973 A * | 7/1982 | Lawrence | 33/DIG. 10 |
| 4,359,302 A | 11/1982 | Payne | |
| 4,907,711 A | 3/1990 | Stuchlik | |
| 5,195,249 A | 3/1993 | Jackson | |
| 5,526,952 A | 6/1996 | Green | |
| 5,639,991 A * | 6/1997 | Schuette | 33/528 |
| 5,813,130 A * | 9/1998 | MacDowell | 33/528 |
| 5,860,219 A | 1/1999 | Wilkinson | |
| D406,537 S | 3/1999 | Sharp | |
| 6,055,736 A | 5/2000 | Gaston | |
| 6,115,926 A | 9/2000 | Robell | |
| 6,223,445 B1 | 5/2001 | Schuette | |
| 6,226,882 B1 * | 5/2001 | Barr | 33/528 |
| 6,434,848 B1 | 8/2002 | Gordon | |
| 6,810,598 B2 | 11/2004 | Boys | |
| D504,336 S | 4/2005 | Mason | |
| 7,086,171 B2 | 8/2006 | Lawson | |
| 7,325,325 B2 | 2/2008 | Gleeson | |
| 7,334,342 B1 | 2/2008 | Barr | |
| 7,343,692 B2 * | 3/2008 | Gould | 33/563 |
| 7,363,720 B2 | 4/2008 | DiGavero | |

(Continued)

OTHER PUBLICATIONS http://www.rochestermagnet.com, printout from Internet on Aug. 26, 2008, 7 pages.

(Continued)

*Primary Examiner*—G. Bradley Bennett
(74) *Attorney, Agent, or Firm*—Robert Ashen, Esq.; David Hong, Esq

(57) ABSTRACT

This application describes a device for making where to locate and to cut the opening for a utility box, windows, panels or other openings on a sheet of building material. This marking device comprises a metal wire mesh screen mounted to or within a rigid peripheral frame and a magnetic template, which mimics the size of the opening to be cut or the object to be measured. This template is magnetically or removably attached to the planar or flat wire mesh screen and aligned with a mounted utility box. Once the flat magnet or template is appropriately placed on the first surface or area to be measured, the marking device is placed upon the second surface or on the sheet of building material (including without limitation plywood or drywall), and the user can trace the location of the opening to be cut using a pen, pencil or other marking implement.

20 Claims, 8 Drawing Sheets

U.S. PATENT DOCUMENTS

| | | | |
|---|---|---|---|
| 2005/0011079 A1 | 1/2005 | Sikora | |
| 2008/0000097 A1* | 1/2008 | DiGavero et al. | 33/528 |
| 2008/0092401 A1* | 4/2008 | Holcombe | 33/528 |
| 2008/0155845 A1* | 7/2008 | Digavero et al. | 33/528 |
| 2008/0263882 A1* | 10/2008 | Knowlton | 33/528 |
| 2010/0126031 A1* | 5/2010 | Crorey | 33/528 |

OTHER PUBLICATIONS

Magnetic Materials Producers Ass'n, Chicago, IL, "MMPA Standard No. 0100-00, Standard Specifications for Permanent Magnet Materials," 28 pages.

www.magnetking.com, 15 page printout from Internet on Aug. 25, 2008.

* cited by examiner

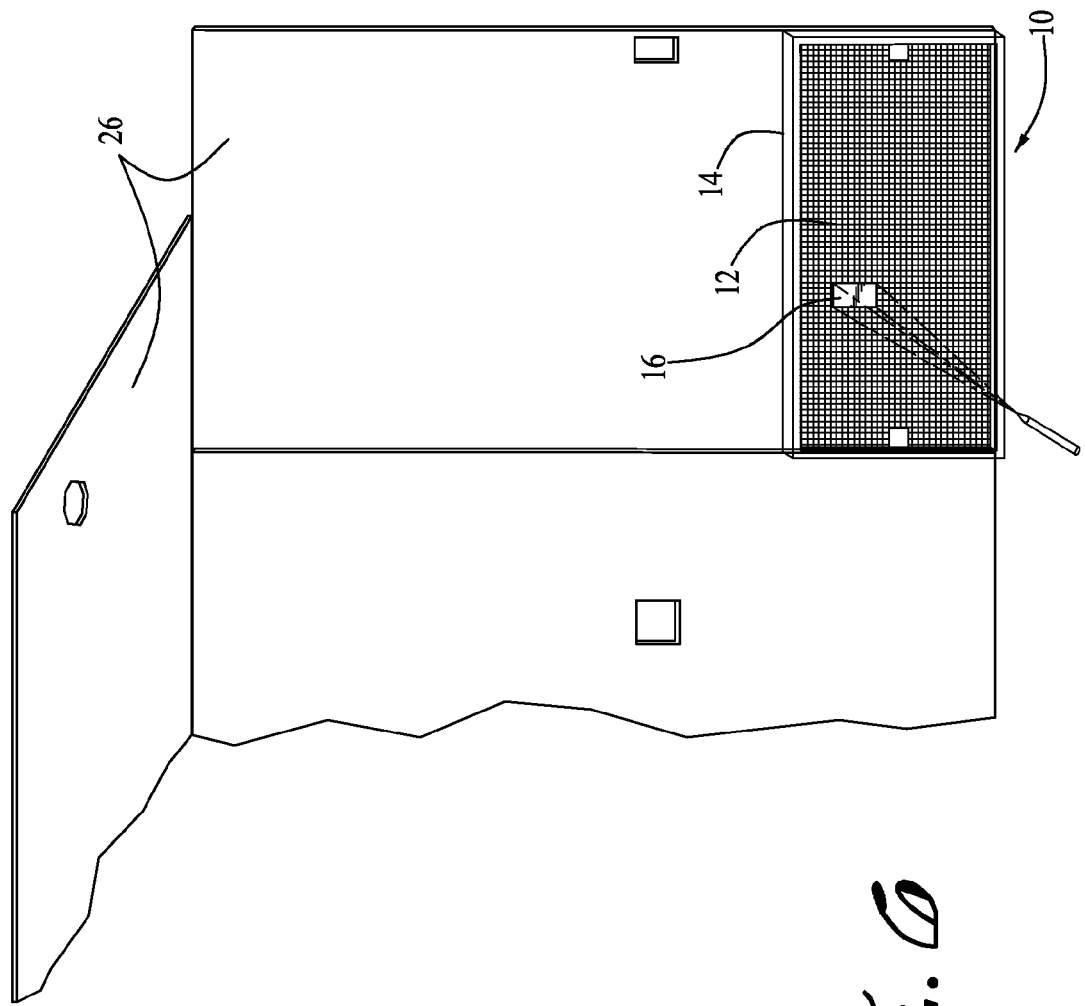
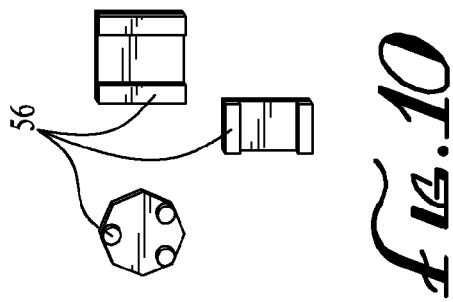

UTILITY BOX MARKING DEVICE

PRIORITY

This application claims the benefit of U.S. Provisional Patent Application No. 61/191,059, filed on Sep. 5, 2008.

BACKGROUND OF THE INVENTION

This invention describes a building accessory to accurately position and mark the location of where to cut a sheet or panel of a building material for a electrical junction box or other panel openings.

A marking device is normally used in conjunction with an electrical outlet box to mark a wall panel with the precise location of that outlet box so the panel can be cut to accommodate the same. In cutting the wall panel, even the most experienced craftsman sometimes experiences difficulties and must be careful in cutting through the interior wall of a building in order to get the right size opening at the proper location for the outlet box, which is located on the opposite side of the wall. Similarly, many "do-it-yourself" homeowners have difficulty in accurately locating and positioning the opening for an electrical junction box on sheet of building material; plus, there is always the challenge of keeping the opening, square and level.

In building construction, drywall sheets, which are commonly sold in 4 foot by 8 foot pieces or 4 foot by 10 foot pieces, are typically mounted on wall studs or ceiling rafters over electrical junction boxes. In order to locate the junction box, measurements relative to the walls, floor or ceiling are taken and then used to determine where the opening should be cut in order to reach the box. This is an inaccurate and time consuming way to locate the junction box.

Various methods and devices for locating electrical junction boxes have been proposed and/or implemented over the years. However, none of the known methods or devices can easily, reliably, quickly and precisely locate the utility boxes during construction.

One method places a paper template over the wall to one side of the framework, where the box is to be installed, marking the wall utilizing the template, cutting the gypsum board along the locations indicated by the markings, removing the cut portion of the gypsum board and inserting the box through the opening, and then attaching the box to the framework. This method is difficult to carry out without damaging the gypsum board or producing an installation that is correctly positioned, i.e. with the side edges of the box being in a straight vertical orientation and properly aligned with the side of the framework.

Another known method uses the utility box itself as the "template" for marking the wall. With this method, the utility box is held against the wall and the wall is marked by tracing around the box with a pen or pencil. The user may simultaneously hold a carpenter's level on top of the box, but simultaneously holding a level while tracing is not easy to do, since the top edges of some utility boxes are not regularly shaped, and the level can interfere with the tracing. In many cases, the installer merely "eyeballs" the correct position, resulting in irregularly-positioned utility boxes.

From the preceding descriptions, it is apparent that the devices currently being used have significant disadvantages. Thus, important aspects of the technology used in the field of invention remain amenable to useful refinement, including the need for an improved marking device for quickly and reliably locating the opening for a utility box on a sheet of building material.

SUMMARY OF THE INVENTION

This application discloses exemplary embodiments, which are generally directed to a marking device for utility boxes, conduit boxes, access panels and other items that protrude or arise through a wall, floor or ceiling. In accordance with one aspect of the invention, the utility box marking device comprises a galvanized steel or metal wire mesh screen mounted within a rigid peripheral frame. A piece or a strip of magnetized material, which is cut to the standard size and shape of the utility box, is magnetically or removably attached to the wire mesh screen and aligned with a mounted utility box, after the framed screen device is positioned adjacent to a framed wall or ceiling, which contains the mounted utility box.

The framed screen device with the attached magnetic strip is then moved away from the framed wall or ceiling and superimposed on a sheet of building material, including without limitation drywall and plywood, with the contours, outline or outside dimensions (2-D) or planar dimensions of the mounted utility box being readily marked with a pen, pencil or other suitable marking indicator or marking device through openings on the mesh sheet directly onto the drywall or plywood sheet.

The marked utility box opening is then cut, and the cut drywall or plywood sheet is installed on the framed wall or ceiling with the prepared opening exactly matching the outline of the mounted utility box.

An apparatus for marking a specific location and planar dimensions of an object on a first surface to a second surface comprising: a frame; a planar sheet, which is connected to said frame; said planar sheet having multiple openings and being able to be magnetically engaged; a template piece, which mimics the planar dimensions of the object; and the template piece having at least one magnetic portion; whereby the frame with the planar sheet is placed on said first surface; the template piece can magnetically engage said planar sheet to indicate the specific location and the planar dimensions of the object on said first surface; and the frame with the planar sheet and magnetically attached template piece can be placed on said second surface to transfer the specific location and the planar dimensions of the object to said second surface.

An apparatus for marking a specific location and planar dimensions of an object from a first surface to a second surface comprising: a planar sheet, which has multiple openings and being able to be magnetically engaged; and a magnet, which mimics the planar dimensions of said object; whereby the magnet can removably engage the planar sheet to indicate and to mark the specific location and the planar dimensions of the object on the first surface and to transfer the specific location and the planar dimensions of the object to the second surface.

A method for using an apparatus for marking a specific location and planar dimensions of an object from a first surface to a second surface, said apparatus comprising: a frame; a planar sheet, which is attached to said frame and said sheet having multiple openings and being magnetically engageable; a template piece, which has at least one magnetic portion; and a surface marking implement, comprising:

a. placing the frame over the first surface;

b. placing the template piece over the specific location on the first surface;

c. contacting the at least one magnetic portion of the template piece to said planar sheet;

d. removing the frame with the planar sheet and the magnetically attached template piece from the first surface and placing said frame with the planar sheet and the magnetically attached template piece on the second surface; and e. drawing an outline of the template piece through the openings of the planar sheet on the second surface with the surface marking implement.

These and other aspects of the invention will become apparent from a review of the accompanying drawings and the following detailed description of the invention.

BRIEF DESCRIPTION OF THE DRAWINGS

FIGS. 1-11 show some preferred embodiments of a utility box marking device. Additional embodiments, features and advantages of the invention will become apparent from the ensuing description or may be learned by practicing the invention. The drawings are not to scale.

FIG. 1 is a view of the utility box marking devices (two useful sizes) and accessories (templates, hook and chain, writing implement and clamps) being used in accordance with one aspect of the present invention.

FIG. 2 is a close up view of the utility box marking device, which details the mesh or web located within the frame and being used in accordance with one aspect of the present invention.

FIG. 3 is cross-sectional view of the utility box marking device, which shows the web or mesh material, the marking or indicator device and a utility box (in broken lines);

FIG. 4 is a view of a typical construction area of a home or building for use of the invention.

FIG. 5 is a view of the utility box marking device being used in a typical construction area of a home or building; FIG. 5 shows use of the clamps to hold the marking device against a horizontal surface; however, use of clamps or other retaining devices are optional, and this marking device can easily be held by a user's hand.

FIG. 6 shows the utility box marking device being placed on the surface of a sheet of drywall or gypsum on the construction area of FIGS. 4 and 5.

FIG. 7 shows the utility box marking device being placed on the ceiling of a room; the device is being held up with a hook and chain.

FIG. 8 shows the utility box marking device being placed on the ceiling of a construction; the device can be held up by the user's hand.

FIG. 9 shows the cross-sectional view of the utility box marking device being used in FIG. 5.

FIG. 10 show other shaped embodiments of the template or indicator for utility boxes or other items to be measured and located.

FIG. 11 shows a view of one embodiment of the template piece with at least one to magnetic portion or magnet.

Figure 1:
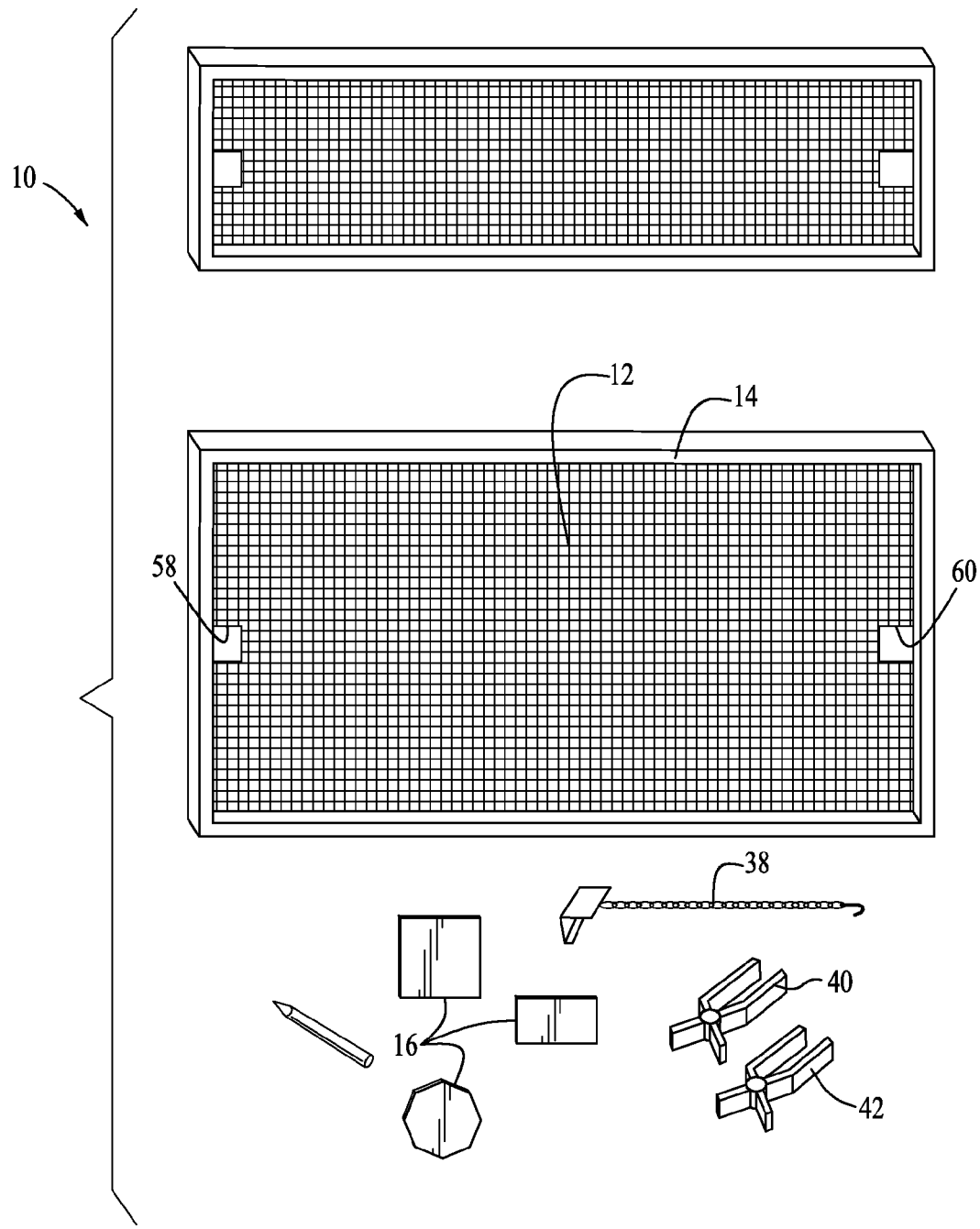

PARTS LIST 10 utility box marking device
12 wire mesh screen or web
14 rigid peripheral frame
16 magnetic marking device or indicator or utility box template
18 framed wall
20 utility box
22 magnet
24 measurement units or hash marks or ruler marks
26 drywall or gypsum surface
30 marking device for ceiling mounted device
34 wire mesh screen or web for ceiling mounted device
36 rigid peripheral frame for ceiling mounted device
38 chained hook or hanger
40, 42 clamps
50 utility box marking device
52 rigid peripheral frame
54 wire mesh
56 magnetized strip or piece
58, 60 recesses for clamps
62, 64 spring-loaded plastic clamps
66 plastic or steel-type hook

DETAILED DESCRIPTION OF THE INVENTION

FIG. 1 depicts a utility box marking device 10 including a galvanized steel or metal wire mesh screen or web 12 mounted within a rigid peripheral frame 14 in accordance with the present invention.

The frame 14 may be made of any suitable rigid or sturdy materials, including without limitation, wood, plastic, metal, fiberglass, bamboo or any other suitable composite material. The frame can also have measurement indicators (inches, centimeters, etc.) or a ruler indicators on the sides of the frames; these measurement indicators can also be corresponding to mesh openings of a specific size (such as ½ inch mesh openings).

The mesh screen or web 12 is typically made of metal or alloy or galvanized steel; however, to work with the magnetic piece 16, the mesh screen or web 12 needs to be able to magnetically engage the magnetic piece or utility box template 16. This mesh screen material is also commonly known as hardware cloth or chicken wire.

This metal mesh can also be described a flat planar sheet with a multitude of openings or a matrix of openings; this flat planar sheet can be made of galvanized steel or other materials that can be magnetically engaged.

The utility box template 16 can have a first side and a second side; the second side can have attached at least one section or at least one portion of magnetized material, several magnets or a piece or strip of magnetized material 16. This marking device or indicator is attached to one side of the metal wire mesh screen 12 at a certain or particular location. This template is to mimic the 2-D or outside or planar dimensions of a utility box or any other sized opening that is normally placed on a wall, ceiling or floor.

The utility box template 16 may comprise a ferromagnetic type material or the like, including without limitation: flat magnetic sheets used for magnetic business cards; flexible magnetic sheeting (0.02-0.12 inch thickness); or flexible extruded magnets. Also, this invention can also employ stronger magnets, such as magnets used to reinforce the seal on a refrigerator door. Magnetic strips or dots can be used to secure the utility box template to the frame. See FIG. 7 of the associated U.S. Provisional Patent Appl. No. 61/191,059 for some magnet specification examples (www.rochestermagnet.com); see also MAGNETIC MATERIALS PRODUCERS ASSOCIATION of Chicago, Ill., Publication No. MMPA Standard No. 0100-00 (28 pages).

In addition, using flexible magnet sheets allows for variation in magnetic strength (including high-energy products, with single- and double-sided magnetization); product flexibility; and various thickness (from 0.015" to 0.060").

Figure 5:
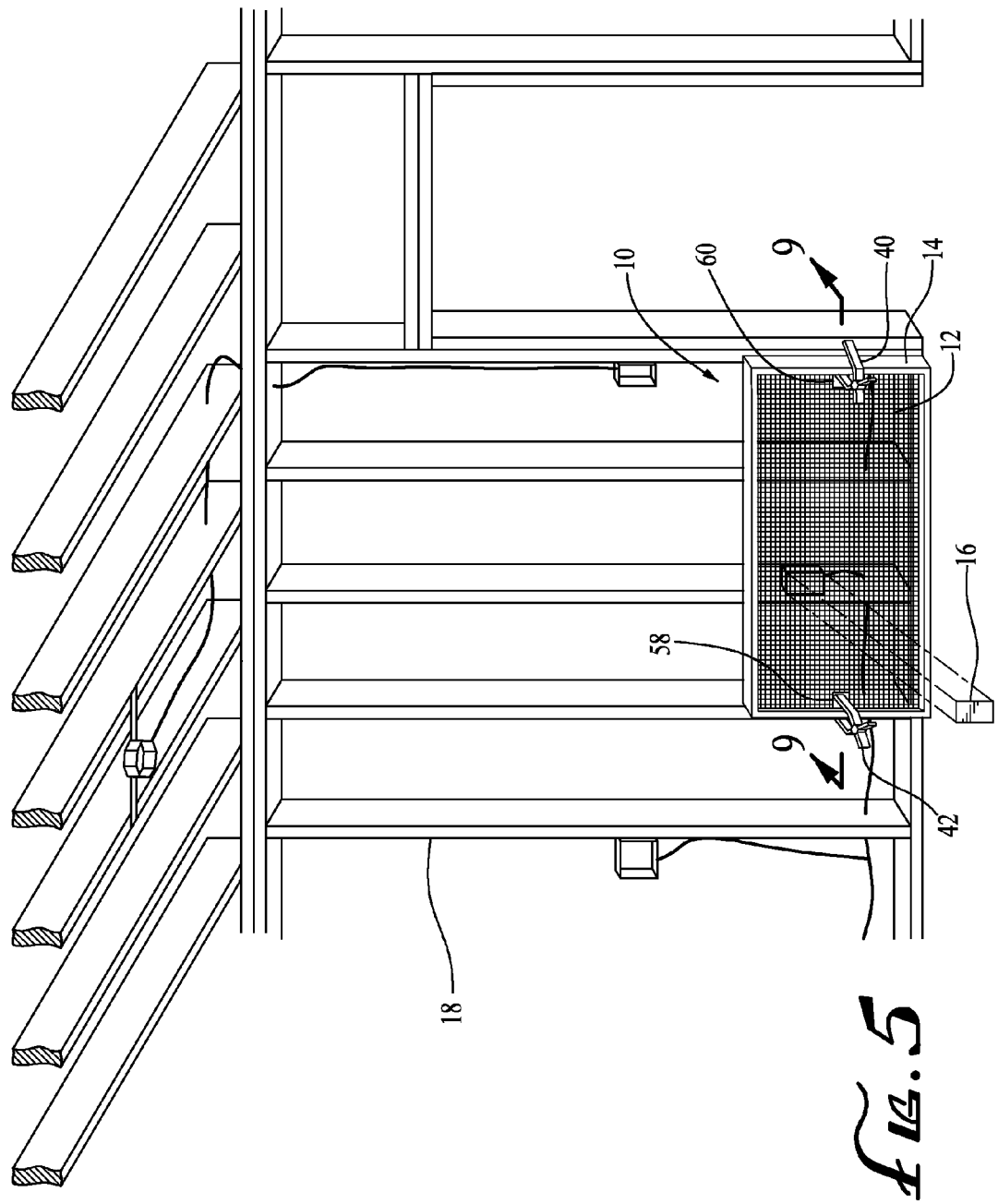

In FIG. 5, the utility box marking device 10 is leaning in an upright position against a framed wall 18, which includes a mounted utility box 20. The utility box 20 may be an electrical junction box, a cable TV junction box or other openings. This invention is also good for marking windows and other wall openings.

Before the framed wall 18 can be covered with a sheet of drywall or other sheeted building material, one would need to measure and to record the location of the mounted utility box 20. The utility box measurements would have to be transferred precisely onto the drywall sheet so that one could cut an exact and corresponding opening in the drywall sheet before mounting on the framed wall 18.

Figure 2:
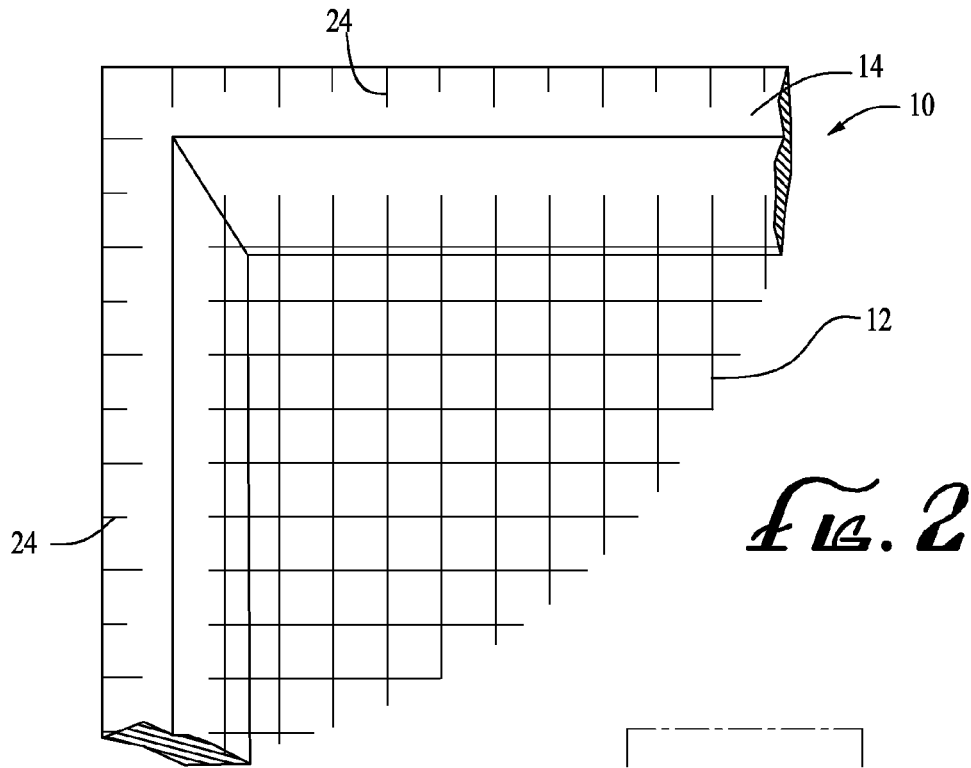

To achieve the foregoing, the user positions utility box marking device 10 adjacent to a section of framed wall 18 (where the drywall sheet is to be mounted) and disposes the utility box template with at least one magnet onto the metal wire mesh screen 12 and directly over the contours of mounted utility box 20 so as to magnetically mark its location, as generally shown in reference to FIG. 2.

For the sake of convenience and speed, the utility box template 16 is preferably the exact shape and size of the utility box 20 or whatever preferred size opening. Since many building items are of a standard size, this invention allows for providing several magnetic sheet pieces, which exactly mimic these standard sizes of the building materials to be oriented.

The utility box template with magnet 16 or the magnet should be of sufficient magnetic strength so as to be able to stay attached to metal wire mesh screen 12 within the desired location while the user transfers utility box marking device 10 onto the drywall sheet. If needed, additional permanent magnet pieces may be provided to ensure secure attachment of the template 16 to metal wire mesh screen 12.

In another possible embodiment: the marking device or indicator or template can be made of a non-magnetic material such as plastic, but also include magnets at various locations on one side to attach to the wire mesh screen 12. In using the magnet, it is preferred the magnet have enough strength to be removable when desired, but also to remain at the desired position until intended removal by the user.

With marking device 10 moved away from framed wall 18 (or first surface) and positioned appropriately over the drywall sheet (or other sheet of building material to be used during construction or second surface), the user marks the outline of mounted utility box 20 directly onto the drywall sheet through the openings in the planar mesh with a pencil, pen, paint brush or any other type of marking indicator.

Typically, the corners can be easily marked with a pen or a pencil or other marking implement (such as a nail or screwdriver). These markings properly locate and define the size, shape, 2-D dimension and position of each desired item to be measured and cutout on the building material (drywall). The user can simply mark the corners of the template through the mesh to allow enough of a guide for a proper cut-out of the object on the plywood, drywall, gypsum or other construction material surface. The multiple openings in the flat metal wire mesh screen facilitates marking of the junction box or receptacle contours directly on to the drywall sheet through the holes in the wire mesh.

Another embodiment of the invention allows for use of the planar metallic mesh or screen to material with multiple openings and without a frame; this planar metallic mesh should also be effectively engaged by a magnet on the template. In addition, instead of a rigid frame, the terminal edges of the planar metallic sheet can be covered with plastic, rubber or another protective material to protect the edges, other surfaces and the user.

The marking device 10 preferably is made of galvanized steel mesh with one-half inch openings to allow easy use of felt marker pen (like a Sharpie brand pen) or pencil for marking. Of course, other sized openings can be used. Regardless of the size of the mesh openings, as long as one can simply make four "dots" at each corner around the magnetic piece and through the mesh, then the openings can be easily marked and cut. This marking system is a lot cleaner than using chalk or erasable marker, and it is more accurate to use a magnetic template than chalk or erasable marker, which can be smudged, dislodged or confused with previous markings As shown in FIG. 2, another embodiment of the frame can have measurement indicators or hash lines to indicate a unit of measurement, including without limitation: inches and centimeters and numbers. Other embodiments can also include at least one "bubble level" or level indicating device or a bevel included in the frame body or attached to the wire mesh or metal planar sheet. Other embodiments may allow the frame to have slots, channels or areas to allow the storage or placement of a writing implement or pen or pencil.

Using the marked outline of utility box 20, the user cuts an opening for mounting the utility box 20 in the drywall sheet. As shown in FIG. 6, the cut drywall sheet is installed onto a respective section of framed wall 18 with the opening exactly matching the contours of mounted utility box 20. This process may be advantageously repeated for successive framed wall sections or for a framed wall section having more than one junction box mounted thereon.

Most commercially available drywall comes in standard sizes of 4 feet by 8 feet or 4 feet by 10 feet sheets. The rigid frame of the marking device 10 can be any shape or size. However, as shown in the embodiments in FIG. 1, the rigid frames are configured in one-foot increments, and the inventor envisions useful template sizes to be 1' by 4' or 2' by 4'. Since the standard drywall sheet is usually 4'×8' feet, using a template of the sizes: (1'×4' or 2'×4') is dimensionally practical.

For wall sections of a greater size than the device template or for junction boxes in the middle of a wall that are larger than the wire device template, the user will start from one side of the wall and place a first drywall sheet. Once the first drywall sheet is placed, the user can use the trailing edge of the first drywall sheet as a guide point for starting the second drywall sheet. The user can employ the previous sheet as a guide or orientation point for the next sheet; as a result, there will always be an edge within the inventor's (1 foot×4 foot) or (2 foot×4 foot) wire template for marking the opening to be located, marked and cut using the invention.

Figure 7:
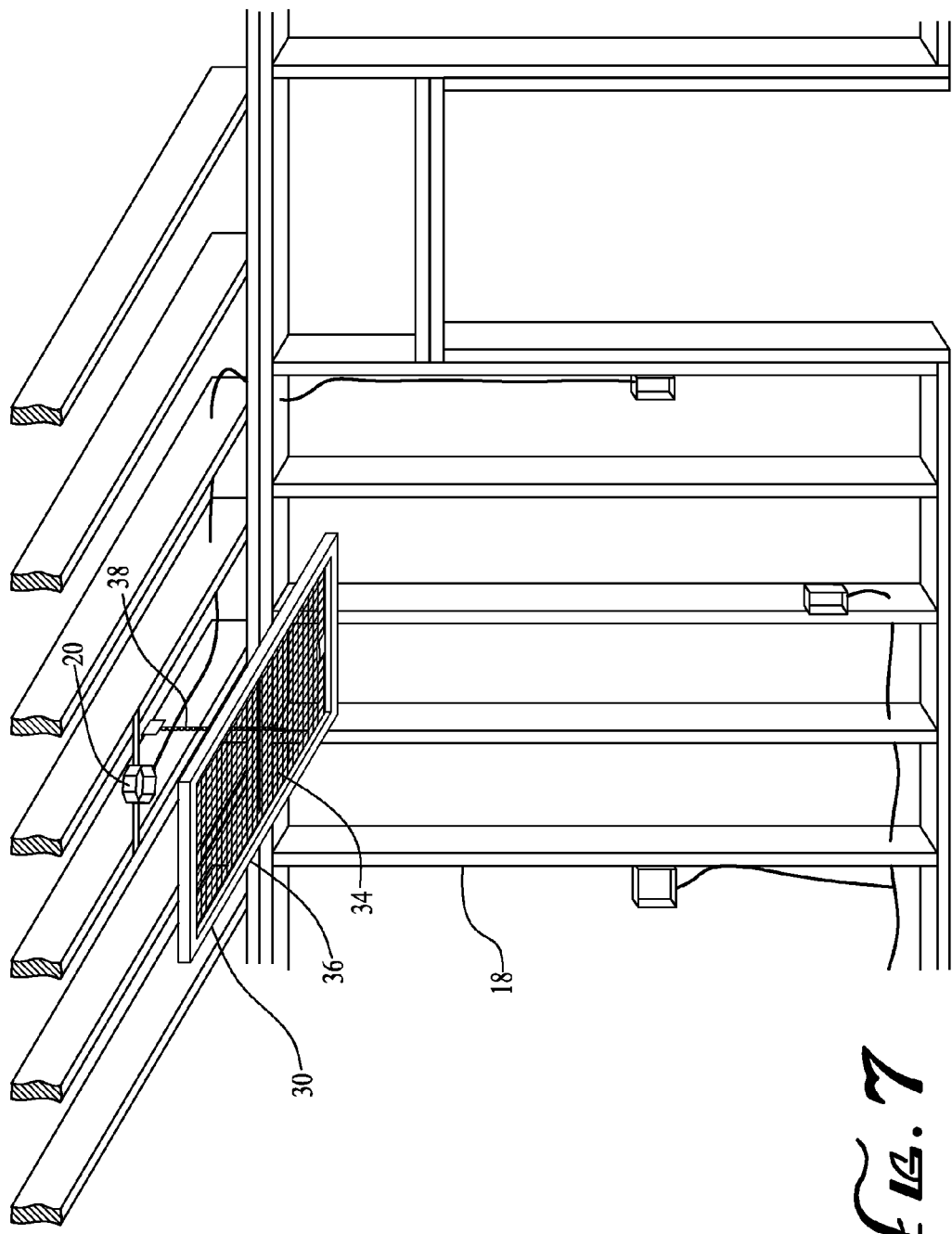
Figure 8:
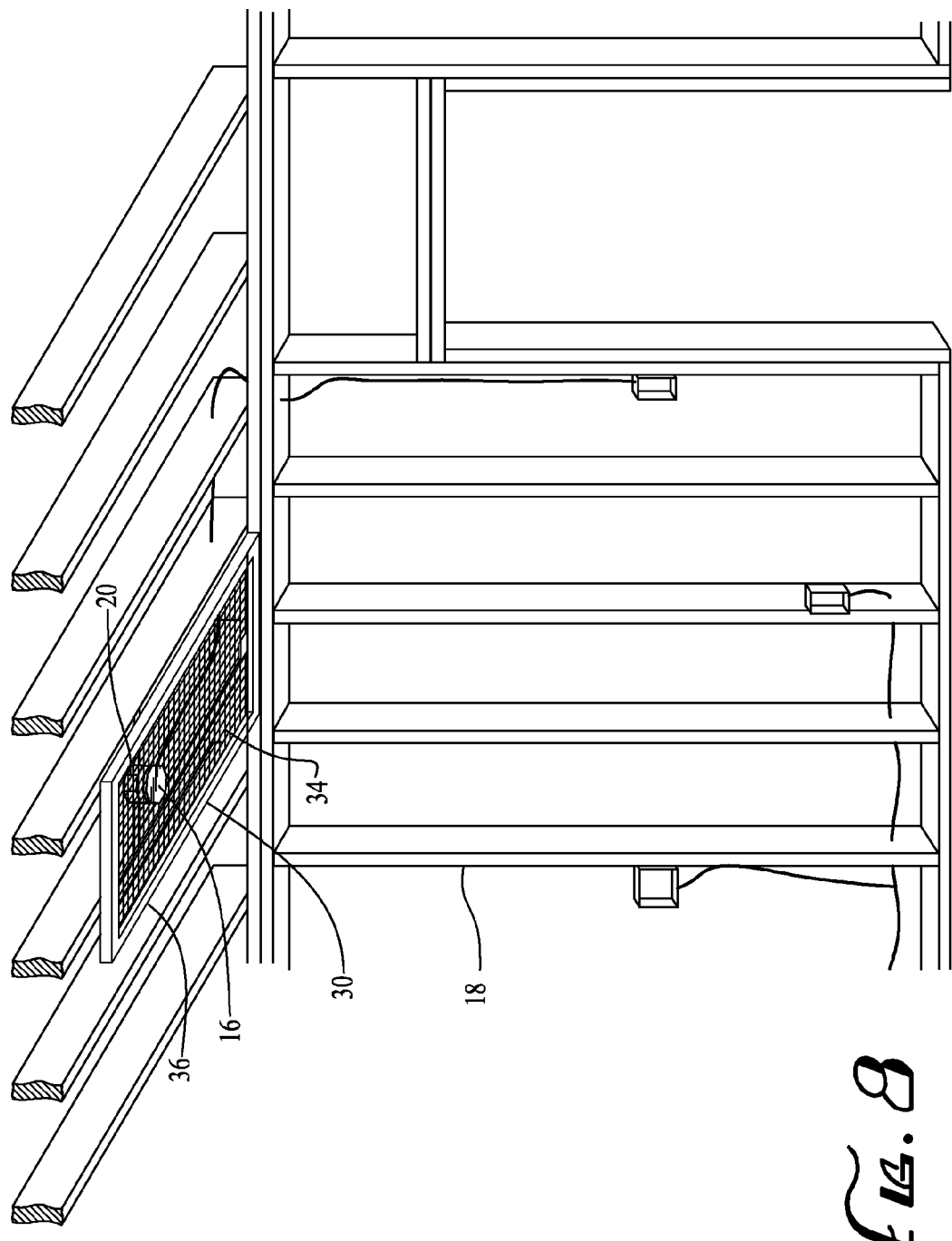
Figure 11:
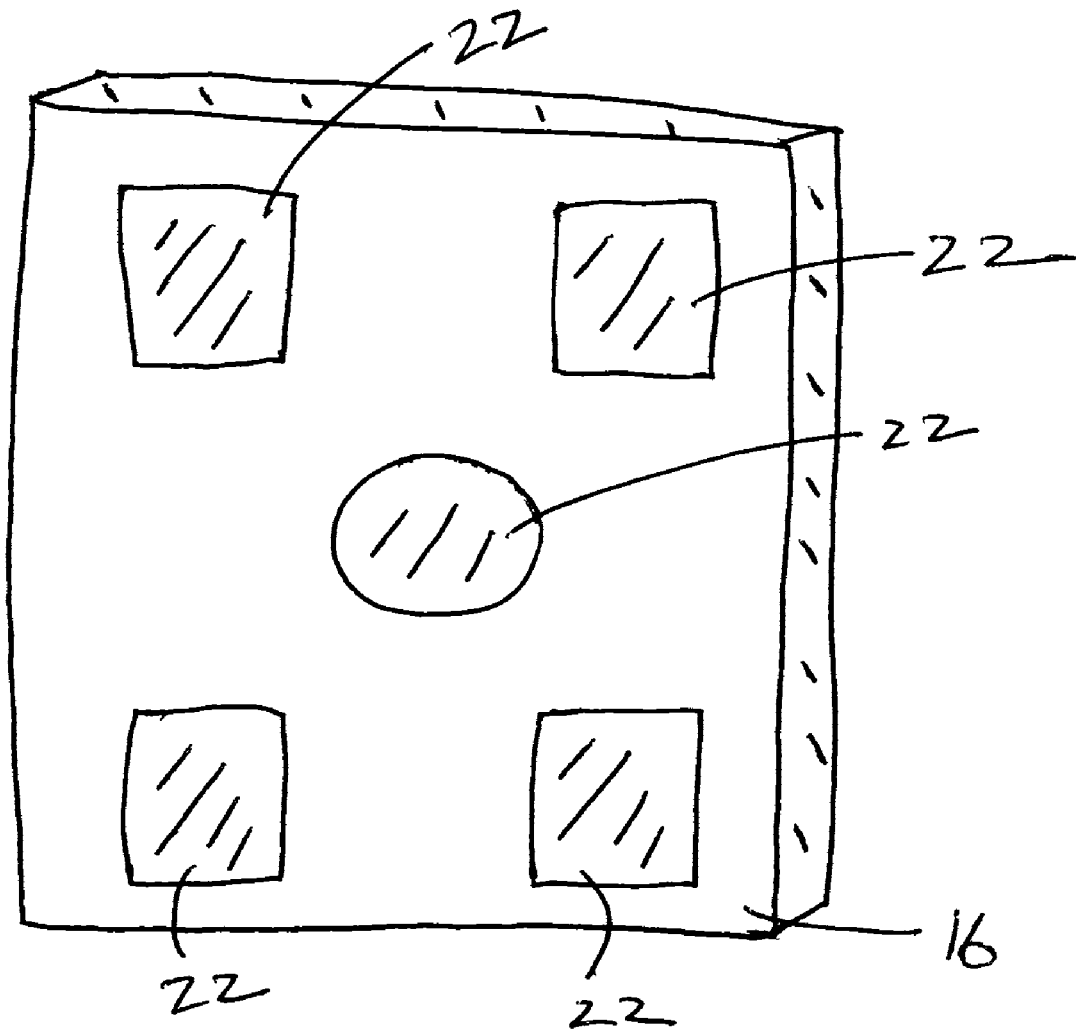

Ceiling Mounted Version (FIG. 7-8)

The utility box marking device is not restricted for use on upright framed wall sections. FIG. 7-8 depict an embodiment of the metal wire mesh marking device 30 (of the type generally shown and described above) to be used on a framed ceiling section 32. This embodiment of the marking device 30 comprises a metal wire mesh screen or web 34, which is mounted within a rigid peripheral frame 36 in accordance with the present invention. A peripheral frame 36 may also be made of wood, plastic, metal, fiberglass or similar materials.

Figure 3:
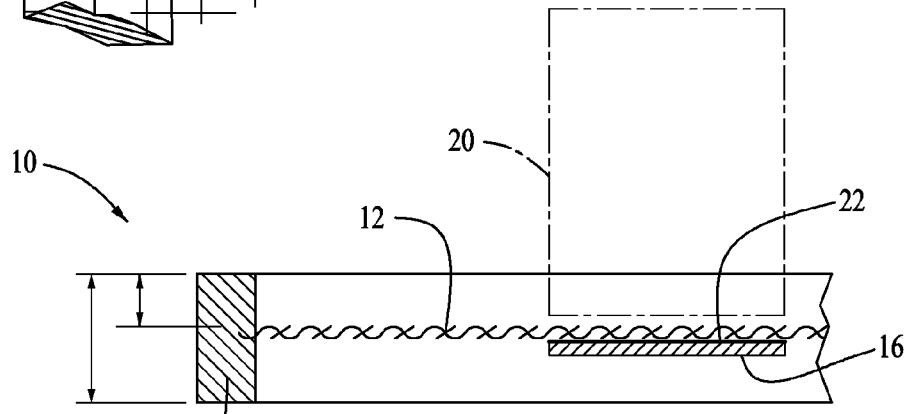

For overhead framed ceiling sections, one may need to temporarily attach the metal wire mesh marking device 30 to the rafters with a chained hook or hanger 38 or the like before marking device 30 can be moved and secured to the rafters via clamps 40, 42 in the desired to overhead location. Once the framed marking device is held up by one hand of the user or securely clamped in an overhead area, which contains a junction box to be marked, the user magnetically attaches the utility box template onto metal wire mesh screen 34 directly over (i.e. aligns the same with) the junction box of interest. A ladder 44 (FIG. 3) may be utilized. The ceiling drywall sheet is then marked, cut and installed in the same manner described above.

In the same embodiment, metal wire mesh screen 12 or 34 is configured with a pattern of one-half inch square openings. The attached figures show a metal wire mesh screen 12 with multiple openings being mounted in the middle of peripheral frame 14, i.e. within one-half inch from the edge of the frame on each side. The mesh is secured within one-half inch from the edge of the frame with the one-half inch distance from the edge of the top side of the frame to the mesh. This one-half inch distance from the edge is to accommodate the one-half inch projection of most electrical junction boxes from a 2'×4' stud piece of lumber. In other embodiments, the planar metal sheet with multiple openings can be fixedly and securely fastened to one side of the frame.

Figure 9:
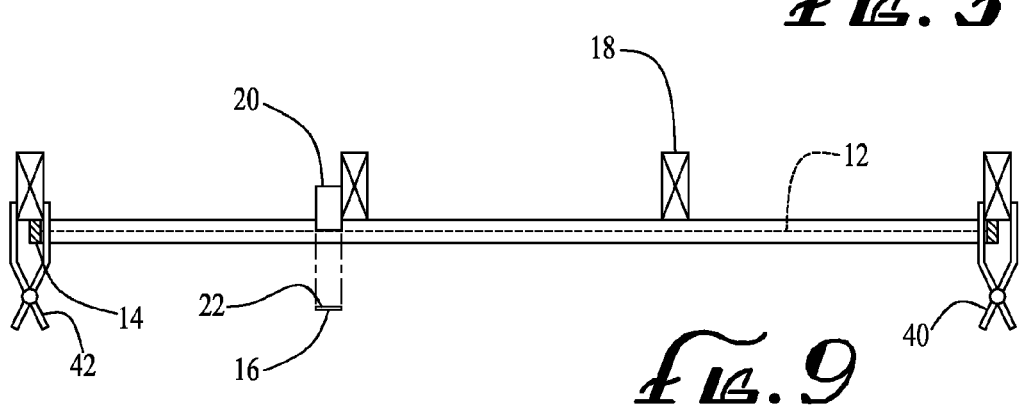
Figure 4:
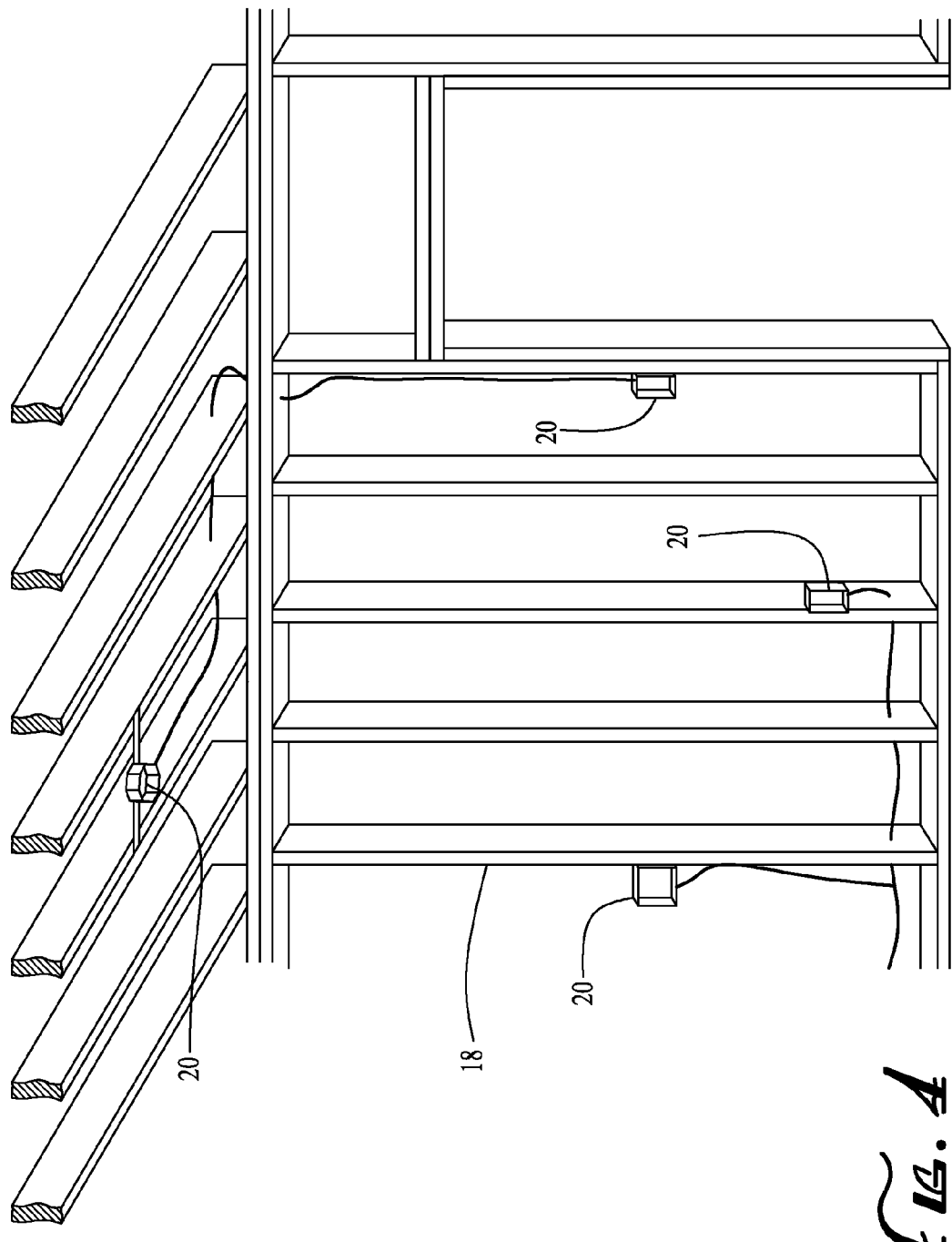

FIG. 1 shows a plan view of a utility box marking device, which is constructed in accordance with the present invention. A rigid peripheral frame is made of strong but lightweight material and has length and width dimensions of about four feet and two feet and four feet by one foot, respectively. Galvanized steel wire mesh (preferably with one-half inch squares) is mounted within a frame. The marking device includes a magnetized template made of steel fabric, which may be positioned over standard framing studs (2"×4" or 2"×6"). The frame also includes recesses or openings on each side for accommodating spring-loaded plastic clamps; these clamp openings or recesses can be 2.5 inches by 2.5 inches or other suitable sizes for accommodating the clamps. FIG. 9 is a side view of the utility box marking device, which also includes a plastic or steel-type hook with a relatively small, smooth chain for temporary attachment to framed ceilings.

A person skilled in the art would further appreciate that the utility box marking device of the present invention may be used with any angled framed wall or ceiling section. Moreover, no measuring or calculating (which may result in errors) is needed when using the utility box marking device of the present invention in the manner described generally hereinabove. Furthermore, the marking device of the present invention may be used not only on drywall sheets, but also on framing plywood sheets which are used as shear walls and the like.

Kit:

This invention can be also presented in a kit with different sized wire frames (such as 1'×4' and 2'×4'); several standard sized magnetic pieces or templates, which mimic the shapes of utility boxes, cable boxes, and other panel openings; and writing devices or pens or pencils. See FIG. 1.

Other versions of this invention can be employed such as non-magnetic versions. Instead of using magnetic sheets and metal wire frame, other embodiments could use templates that are shaped to mimic electrical utility boxes or other preferred sized openings; these templates would have some sort of means such as clasps or hooks to grasp the wire frame device.

Other versions of the invention can have a template with a first side and a second side. The second side of the template has at least one magnet or magnet portion or a planar or sheet magnet affixed.

As required, detailed embodiments of the present invention are disclosed; however, the disclosed embodiments are merely exemplary of the invention, which can be embodied in to various forms. Specific structural and functional details disclosed here are not to be interpreted as limiting, but merely as a basis for the claims and as a representative basis for teaching one skilled in the art to variously employ the present invention in virtually any appropriately detailed structure. Further, the terms and phrases used here are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Any element in a claim that does not explicitly state "means for" performing a specific function, or "step for" performing a specific function, is not be interpreted as a "means" or "step" clause as specified in 35 U.S.C. Sec. 112, Paragraph 6. In particular, the use of "step of" in the claims herein is not intended to invoke the provisions of 35 U.S.C. Sec. 112, Paragraph 6.

I claim:

1. An apparatus for marking a specific location and planar dimensions of an object on a first surface to a second surface comprising:
    a frame;
    a planar sheet, which is connected to said frame;
        said planar sheet having multiple openings;
        said planar sheet being able to be magnetically engaged;
    a template piece, which mimics the planar dimensions of the object; and
        the template piece having at least one magnetic portion;
        whereby the frame with the planar sheet is placed on said first surface; the template piece can magnetically engage said planar sheet to indicate the specific location and the planar dimensions of the object on said first surface; and the frame with the planar sheet and magnetically attached template piece can be placed on said second surface to transfer the specific location and the planar dimensions of the object to said second surface.

2. The apparatus of claim 1 wherein the planar sheet is galvanized steel wire mesh.

3. The apparatus of claim 1 wherein the template piece is a magnet and is shaped to mimic the planar dimensions of the object.

4. The apparatus of claim 1 wherein the template piece is a planar magnet and is shaped to mimic the planar dimensions of the object.

5. The apparatus of claim 1 further comprising a writing implement; said writing implement can be passed through the openings of the planar sheet and mark the planar dimensions and the location of the object on said surface.

6. The apparatus of claim 1 wherein the frame has a first frame end and a second frame end; and each of said frame ends having a frame end opening.

7. The apparatus of claim 6 wherein there is a clamp, which can engage the frame and through said frame end openings.

8. The apparatus of claim 1 wherein there is a hook and chain device, which can connect said apparatus to said surface.

9. The apparatus of claim 1 where there are multiple measurement indicators on the frame.

10. An apparatus for marking a specific location and planar dimensions of an object from a first surface to a second surface comprising:
    a planar sheet;
        said planar sheet has multiple openings;

said planar sheet being able to be magnetically engaged; and a magnet, which mimics the planar dimensions of said object;
  whereby the magnet can removably engage the planar sheet to indicate and to mark the specific location and the planar dimensions of the object on the first surface and to transfer the specific location and the planar dimensions of the object to the second surface.

11. The apparatus of claim 10 further comprising a frame, and the planar sheet is attached to said frame.

12. The apparatus of claim 11 further comprising multiple measurement indicators on the frame.

13. The apparatus of claim 11 further comprising a bubble-type level indicator device on the frame.

14. The apparatus of claim 11 wherein the frame has a first frame end and a second frame end; and each of said frame ends having a frame end opening.

15. The apparatus of claim 14 wherein there is a clamp, which can engage the frame and through said frame end openings.

16. The apparatus of claim 10 wherein the planar sheet is galvanized steel wire mesh.

17. The apparatus of claim 10 wherein the magnet is planar and is shaped to mimic the planar dimensions of the object.

18. A method for using an apparatus for marking a specific location and planar dimensions of an object from a first surface to a second surface, said apparatus comprising:

a frame;
a planar sheet, which is attached to said frame;
  said planar sheet having multiple openings;
  said planar sheet being magnetically engageable;
a template piece;
  the template piece having at least one magnetic portion;
a surface marking implement;
comprising:
a. placing the frame over the first surface;
b. placing the template piece over the specific location on the first surface;
c. contacting the at least one magnetic portion of the template piece to said planar sheet of the frame;
d. removing the frame with the planar sheet and the magnetically attached template piece from the first surface and placing said frame with the planar sheet and the magnetically attached template piece on the second surface; and
e. drawing an outline of the template piece through the openings of the planar sheet on the second surface with the surface marking implement.

19. The method for using an apparatus of claim 18 wherein the at least one magnetic portion is a planar magnet and is shaped to mimic the planar dimensions of the object.

20. The method for using an apparatus of claim 18 wherein the planar sheet is galvanized steel wire mesh.

* * * * *